US012131879B2

(12) United States Patent
Marinov et al.

(10) Patent No.: US 12,131,879 B2
(45) Date of Patent: Oct. 29, 2024

(54) VACUUM INTERRUPTER MODULE FOR A TAP CHANGER, POWER DIVERTER SWITCH, AND TAP CHANGER

(71) Applicant: Hitachi Energy Ltd, Zürich (CH)

(72) Inventors: Plamen Danchev Marinov, Sofia (BG); Petar Mitev, Sofia (BG); Mark Newbill, Humboldt, TN (US); Christopher Whitten, Humboldt, TN (US)

(73) Assignee: HITACHI ENERGY LTD, Zürich (CH)

( * ) Notice: Subject to any disclaimer, the term of this patent is extended or adjusted under 35 U.S.C. 154(b) by 270 days.

(21) Appl. No.: 17/669,557

(22) Filed: Feb. 11, 2022

(65) Prior Publication Data

US 2022/0384123 A1 Dec. 1, 2022

(30) Foreign Application Priority Data

May 31, 2021 (EP) .................................... 21176871

(51) Int. Cl.
*H01H 9/00* (2006.01)
*H01F 29/04* (2006.01)
(Continued)

(52) U.S. Cl.
CPC ........... *H01H 9/0038* (2013.01); *H01F 29/04* (2013.01); *H01H 9/0027* (2013.01); *H01H 33/6661* (2013.01); *H01H 3/60* (2013.01)

(58) Field of Classification Search
CPC .. H01H 9/0038; H01H 9/0027; H01H 9/0016; H01H 9/0044; H01H 3/60; H01H 3/42; H01H 33/6661; H01F 29/04
(Continued)

(56) References Cited

U.S. PATENT DOCUMENTS 3,374,320 A 3/1968 Karl et al.
3,720,867 A * 3/1973 Rathbun .............. H01H 9/0038 323/341
(Continued)

FOREIGN PATENT DOCUMENTS

CN 109559933 A 4/2019
DE 1170260 B 5/1964
(Continued)

OTHER PUBLICATIONS

Extended European Search Report dated Nov. 19, 2021 for European Patent Application No. 21176871.8, 9 pages.

*Primary Examiner* — William A Bolton
(74) *Attorney, Agent, or Firm* — Sage Patent Group

(57) ABSTRACT

A vacuum interrupter module for a tap changer includes an insulation plate having a first main side and a second main side opposite of the first main side, a vacuum interrupter assembly, a bypass switch assembly, and a control cam. The vacuum interrupter assembly includes a vacuum interrupter and a driving mechanism coupled with the vacuum interrupter, the vacuum interrupter and the driving mechanism being arranged on the first main side of the insulation plate. The bypass switch assembly includes two bypass contacts, each one mechanically connected to a corresponding bypass lever, the two bypass contacts and the two corresponding bypass levers being arranged on the first main side of the insulation plate. The control cam is arranged on the first main side of the insulation plate and configured to actuate both the driving mechanism and, through the corresponding bypass levers, the two bypass contacts.

20 Claims, 10 Drawing Sheets

(51) Int. Cl.
*H01H 3/60* (2006.01)
*H01H 33/666* (2006.01)

(58) Field of Classification Search
USPC .......... 218/118, 120; 200/11 TC, 6 B, 6 BA, 200/324
See application file for complete search history.

(56) References Cited

U.S. PATENT DOCUMENTS 5,107,200 A 4/1992 Dohnal et al.
5,191,179 A * 3/1993 Yatchum .............. H01H 9/0027 200/18
5,266,759 A 11/1993 Dohnal et al.
5,589,675 A * 12/1996 Walters ................ H01H 33/666 218/140
5,594,223 A * 1/1997 Fukushi ............... H01H 9/0038 218/120
6,060,669 A 5/2000 Dohnal et al.
9,082,573 B2 * 7/2015 Zhu ...................... H01H 9/0038
9,401,249 B2 * 7/2016 Elick .................... H01H 9/0044
9,455,658 B2 * 9/2016 Kammerl ................ H02P 13/06
9,570,248 B2 * 2/2017 Raith ................... H01H 9/0005
9,601,292 B2 * 3/2017 Gerovac ................ H01H 50/44
10,418,196 B2 * 9/2019 Larrieta Zubia ..... H01H 9/0016
10,460,884 B2 * 10/2019 Pankofer ................ H01F 29/04
10,643,802 B2 * 5/2020 Hammer .............. H01H 9/0016
10,692,664 B2 * 6/2020 Zerr ........................ H01F 29/04
2012/0222988 A1 9/2012 Brasher
2014/0159847 A1 * 6/2014 Wrede ..................... H02P 13/06 336/150
2014/0176273 A1 6/2014 Elick et al.
2015/0047954 A1 2/2015 Elick et al.
2015/0047955 A1 2/2015 Elick et al.
2015/0061806 A1 3/2015 Teising et al.

FOREIGN PATENT DOCUMENTS

EP 3104387 A1 12/2016
WO 2013120641 A1 8/2013

* cited by examiner

VACUUM INTERRUPTER MODULE FOR A TAP CHANGER, POWER DIVERTER SWITCH, AND TAP CHANGER

CROSS-REFERENCE TO RELATED APPLICATIONS

The present application claims benefit of priority to European Patent Application No. 21176871.8, filed May 31, 2021, and is assigned to the same assignee as the present application and is incorporated herein by reference.

BACKGROUND

The present disclosure relates to vacuum interrupter module for a tap changer. The present disclosure further relates to a power diverter switch and a tap changer, in particular a transformer load tap changer.

Vacuum interrupters are widely used in utility power transmission systems, power generation units and power-distribution systems for railways, for example. Therein, the vacuum interrupter realizes a switch of a medium-voltage circuit-breaker, generator circuit-breaker, or high-voltage circuit-breaker which uses electrical contacts in a vacuum to reliably separate the electrical contacts resulting in a metal vapour arc, which is quickly extinguished. In this respect, it is a challenge to provide stable and reliable mechanisms to transmit the motion from a driving unit to a contact rod of the vacuum interrupter and an associated bypass switch connected to the electrical contacts, and with respect to interacting components to keep wear low.

SUMMARY

Aspects of the present disclosure relate to a vacuum interrupter module comprising a vacuum interrupter assembly and a bypass switch assembly for a power diverter switch that enables secure and reliable switching of electrical contacts of the vacuum interrupter and an associated bypass switch and contributes to an enhanced life of the vacuum interrupter module. Further aspects of the present disclosure relate to a corresponding power diverter switch and load tap changer including such a vacuum interrupter module.

According to a first aspect, a vacuum interrupter module for a tap changer comprises an insulation plate having a first main side and a second main side opposite of the first main side, a vacuum interrupter assembly, a bypass switch assembly, and a control cam. The vacuum interrupter assembly comprises a vacuum interrupter and a driving mechanism coupled with the vacuum interrupter, the vacuum interrupter and the driving mechanism being arranged on the first main side of the insulation plate. The bypass switch assembly comprises two bypass contacts, each one mechanically connected to a corresponding bypass lever, the two bypass contacts and the two corresponding bypass levers being arranged on the first main side of the insulation plate. The control cam is arranged on the first main side of the insulation plate and configured to actuate both the driving mechanism and, through the corresponding bypass levers, the two bypass contacts.

Due to the described configuration of the vacuum interrupter module, both the vacuum interrupter assembly and the bypass switch assembly can be controlled by a single control cam, thus enabling a simple mechanical set-up and perfect phase synchronization between the respective electrical switching components. At the same time, their arrangement on a common side of the insulation plate means that essentially all mechanical components subject to wear are easily accessible in a mounted position. In particular, in some embodiments, no transmission system is required on the second main side. Consequently, the disclosed vacuum interrupter module may enable secure and reliable switching of electrical contacts of the vacuum interrupter and bypass contacts and contributes to better maintenance and thus an enhanced life of the vacuum interrupter module.

It is a recognition of the present disclosure that conventional designs for power diverter switches and control of a vacuum interrupter often has a relatively complex mechanism with many moving parts and modules. These modules are interdependent and follow specific sequence, which lead to their complex design and further difficulties during manufacturing and maintenances.

By use of the vacuum interrupter module of the present disclosure it is possible to counteract the aforementioned adverse effects at least. Due to the simple and compact design of the common control cam that controls the movement of both the vacuum interrupter and bypass contacts, their relative movements can be synchronized and the overall part count of the module can be reduced, making the individual parts more accessible for maintenance.

According to an embodiment of the first aspect, the control cam has a first cam profile and a second cam profile arranged on two opposite sides of the control cam, wherein the first cam profile is used for control of the vacuum interrupter assembly via the driving mechanism, and the second cam profile is used for control of the two bypass contacts via the corresponding bypass levers. Thus, the two different motions can be designed and controlled individually, but operated synchronized in phase.

According to a second aspect, a power diverter switch comprises a vacuum interrupter module according to the first aspect and a selector switch assembly electrically coupled with electrical contacts of the vacuum interrupter module.

According to a third aspect, a tap changer, in particular a transformer load tap changer, comprises a plurality of power diverter switches and at least one insulation shaft, mechanically connecting the control cam of each one of the plurality of power diverter switches and configured to transmit an incoming motion.

Such a configuration of a power diverter switch and a tap changer comprising an improved vacuum interrupter module enables secure and reliable switching or separation of electrical contacts of the vacuum interrupter and the bypass contacts. As a result, the power diverter switch and tap changer according to the second and third aspect, respectively, also exhibit the improved characteristics of the vacuum interrupter module according to the first aspect and vice versa. Thus, the present disclosure comprises several aspects, wherein every feature described with respect to one of the aspects is also disclosed herein with respect to the other aspect, even if the respective feature is not explicitly mentioned in the context of the specific aspect.

BRIEF DESCRIPTION OF THE DRAWINGS

Exemplary embodiments are explained in the following with the aid of schematic drawings and reference numbers. The figures show.

The accompanying figures are included to provide a further understanding. It is to be understood that the embodiments shown in the figures are illustrative representations and are not necessarily drawn to scale. Identical reference numbers designate elements or components with identical functions. In so far as elements or components correspond to one another in terms of their function in different figures, the description thereof is not repeated for each of the following figures. For the sake of clarity elements might not appear with corresponding reference symbols in all figures possibly.

DETAILED DESCRIPTION

Figure 1:
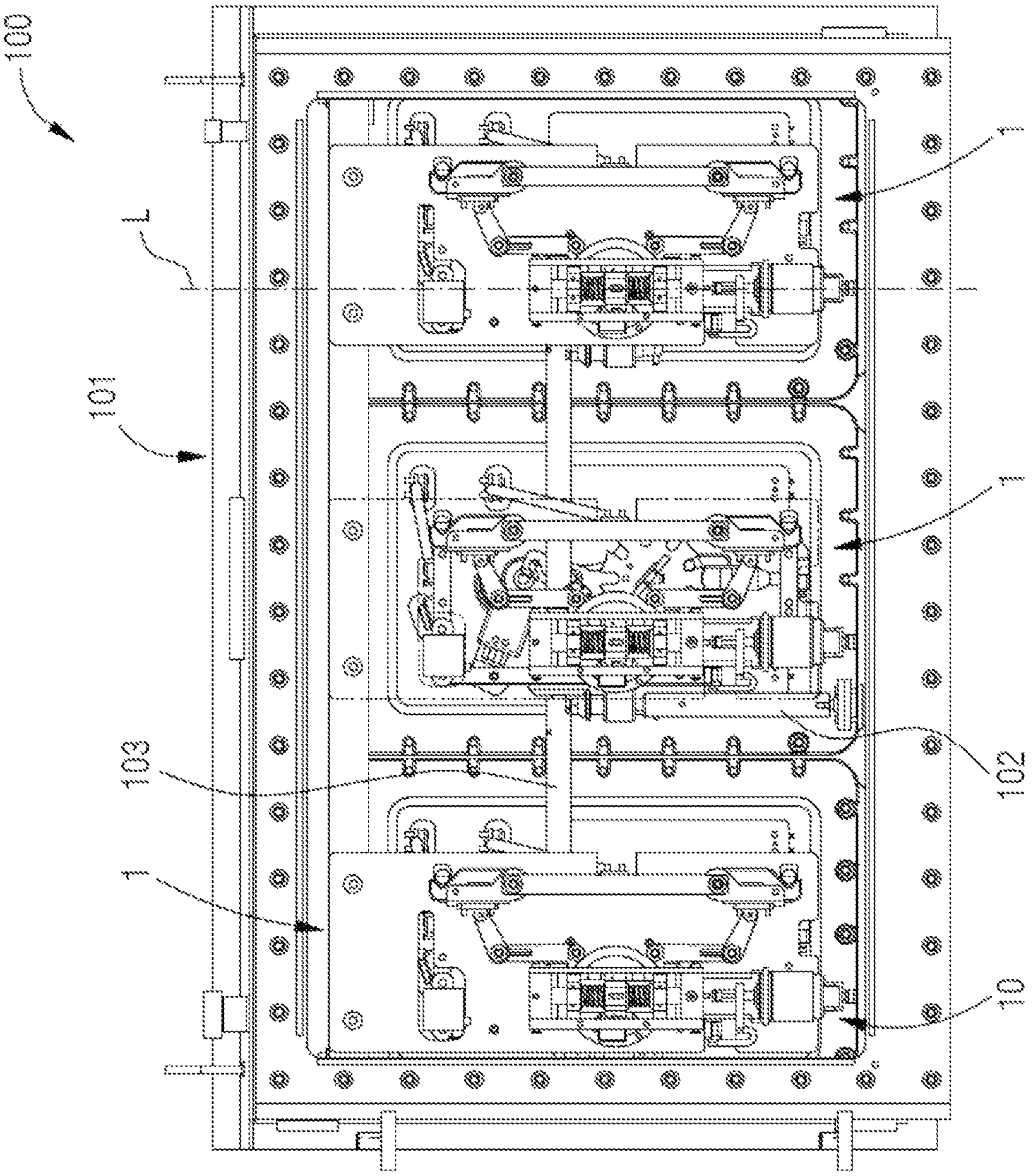
FIG. 1 an embodiment of a transformer load tap changer.

FIG. 1 illustrates a cross section side view of an embodiment of a transformer load tap changer 100 for setting a gear ratio comprising a tank 101 that encloses a fluid, and three power diverter switches arranged inside the tank 101 and immersed in the fluid. The transformer load tap changer 100 comprises drive motor drive shaft 102 and insulation shafts 103 to control the power diverter switches and their vacuum interrupter modules 1. A movement to operate the transformer load tap changer 100 is received through the motor drive shaft 102. That motor drive shaft 102 is connected to a motor drive unit, which is mounted to the tank 101. The motor drive shaft 102 is then connected to a bevel gear structure, which by the means of the insulation shafts 103 is distributing the movement to the three phases of the corresponding vacuum interrupter modules 1.

Figure 2:
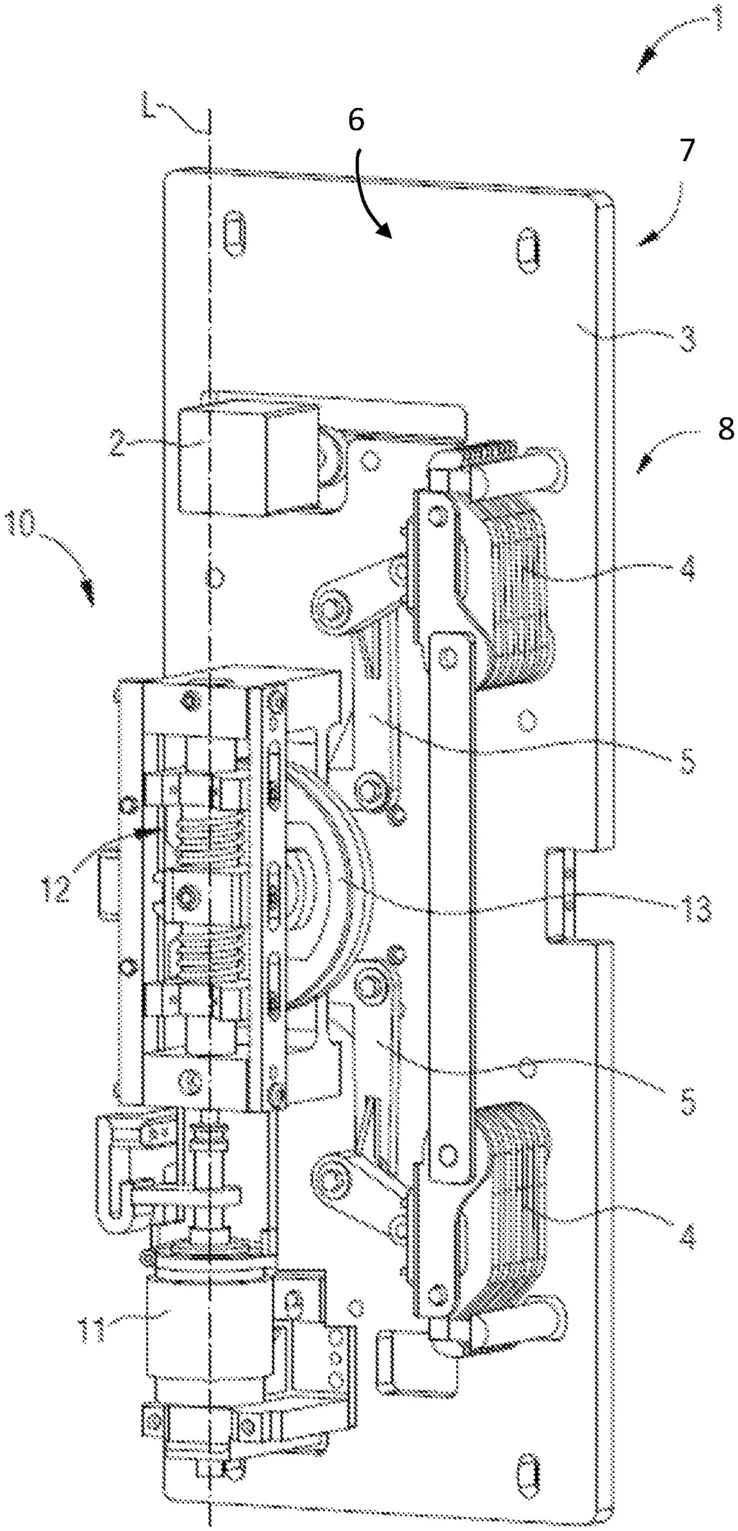
FIG. 2 an embodiment of a vacuum interrupter module for the transformer load tap changer in a perspective view, FIG. 3 the vacuum interrupter module according to FIG. 2 in a side view, FIG. 4 a first cam profile of a control cam of the vacuum interrupter module according to FIG. 2, FIG. 5 a mechanical coupling of a vacuum interrupter assembly with the first cam profile of FIG. 4, FIG. 6 a second cam profile of the control cam of the vacuum interrupter module according to FIG. 2.

FIG. 2 illustrates one power diverter switch assembly or vacuum interrupter module 1 of the transformer load tap changer 100 in a perspective view. The vacuum interrupter module 1 comprises an insulation plate 3 and current transformer 2 attached to the insulation plate 3. The insulation plate forms a support structure for the vacuum interrupter module 1 and may be composed of a rigid dielectric material, such as fiber-reinforced dielectric plastic. On a front side 6 of the insulation plate 3, a bypass switch assembly 8 and a vacuum interrupter assembly 10 is mounted. A backside 7 of the insulation plate 3 can be used for carrying copper bars used for schematic connection. Incoming motion from a selector is transferred to a cam end of a control cam 13 through the means of the insulation shafts 103. The control cam 13 is configured to actuate the bypass contacts 4 through corresponding bypass levers 5. At the same time the control cam 13 is configured to load and discharge a spring accumulator inside a driving mechanism 12 as detailed later with respect to FIGS. 4 and 5.

The vacuum interrupter module 1 comprises the vacuum interrupter assembly 10 including a vacuum interrupter 11 and the driving mechanism 12 that is coupled with the vacuum interrupter 11 and that is configured to drive opening and closing of electrical contacts of the vacuum interrupter 11. The transformer load tap changer 100 and the respective vacuum interrupter modules 1 further includes, for each phase winding, the bypass switch module 8, and may further include, for each phase winding, a selector switch assembly (not visible in FIG. 2). The selector switch assembly can be configured to make connections between taps, while the bypass switch assembly 8 may be configured to connect the tap to a main power source. During tap changes, the vacuum interrupter module 1 safely carries the current between the tap and a main power circuit. A drive system is configured to move a selector switch, the bypass switch assembly 8 and the vacuum interrupter module 1.

Figure 3:
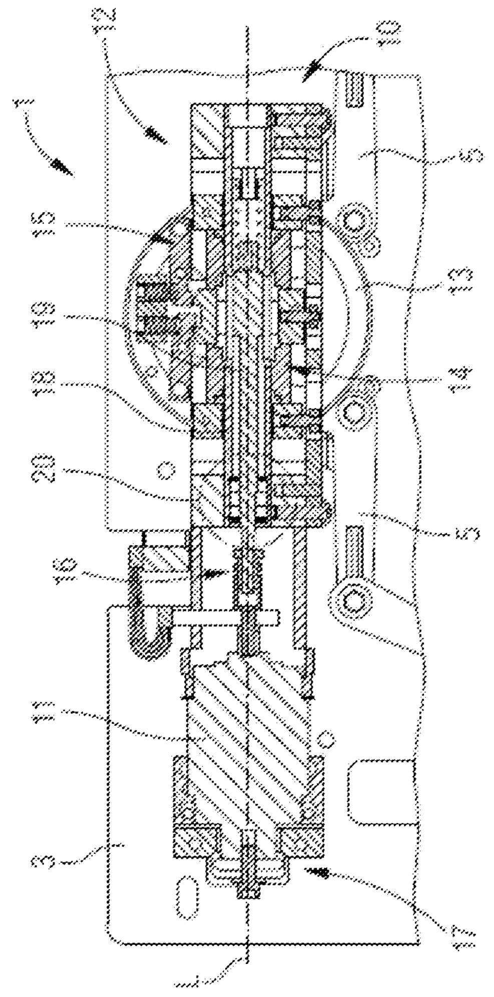

The control cam 13 is coupled with the vacuum interrupter assembly 10 and is configured to drive the driving mechanism 12 to open and close the electrical contacts of the vacuum interrupter 11 (see FIG. 3). The driving mechanism 12 includes a driving rod 19 and a guiding tube 18 enclosing the driving rod 19 such that the driving rod 19 is axially movable inside the guiding tube 18 along a longitudinal axis L of the vacuum interrupter assembly 10. The driving mechanism 12 further includes a damping unit 20, configured to hydraulically dampen the movement of the driving rod by means of the fluid, in which the entire assembly is immersed.

According to the cross section view of the embodiment as illustrated in FIG. 3, the vacuum interrupter module 1 further comprises one or more driving springs 14, a locking mechanism 15, an adjusting system 16 and a locking system 17.

The driving springs 14 accumulate the needed energy to provide proper switching speed of the vacuum interrupter module 1. The locking mechanism 15 and the locking system 17 are used for defining the two positions of the vacuum interrupter 11. Further, the locking system 17 is clamping the vacuum interrupter 11 toward the insulation plate 3. The adjusting system 16 is configured to adjust a contact gap and to provide solution for axial discrepancies during assembling of the vacuum interrupter module 1 and the vacuum interrupter assembly 10. The damping unit 20 is configured to provide reliable damping when the driving rod 19 is closing the vacuum interrupter 11 and when the driving rod 19 is opening the vacuum interrupter 11, respectively.

Figure 4:
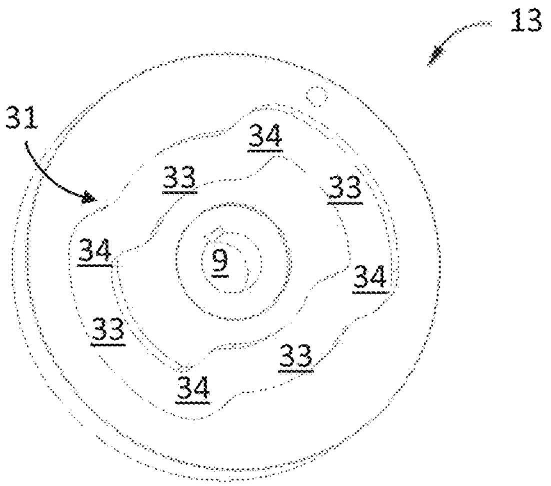
Figure 5:
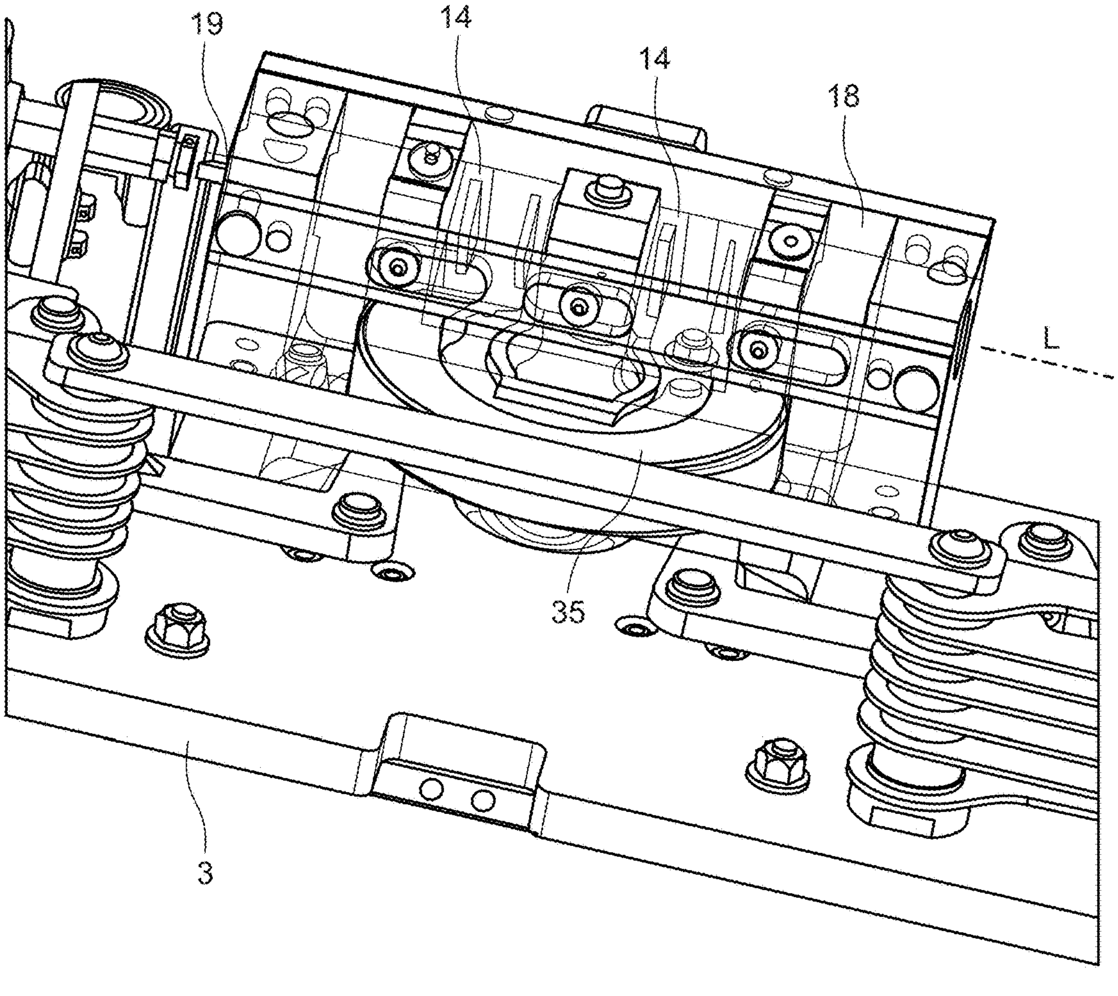

As shown in FIG. 4, a first cam profile 31 is formed at a first main side of the essentially circular control cam 13. In the described embodiment the first main side corresponds to the top side of the control cam 13 facing away from the insulation plate 3 and towards the driving mechanism 12. The first cam profile 31 establishes an almost rectangular guiding pathway, surrounding a central hole 9 for connecting the control cam 13 to a drive shaft. The pathway can also be described as four quarter circles 33 with alternating smaller and larger radii, and four connecting C-shaped portions 34. As shown in FIG. 5, a first cam follower 35 engages with the first cam profile 31 to control the vacuum interrupter assembly 10. In particular, the first cam follower 35 is attached to the driving rod 19 and moves the driving rod 19 inside the guiding tube 18 along the longitudinal axis L, thereby charging the spring accumulator of the driving mechanism 12 formed by two springs 14 arranged between the driving rod 19 and the guiding tube 18.

The vacuum interrupter assembly 10 is configured such that, when the driving rod 19 is driven towards the vacuum interrupter 11, the electrical contacts of the vacuum interrupter 11 are closed. Inversely, the vacuum interrupter assembly 10 is configured such that, when the piston 29 is driven away from the vacuum interrupter 11, the electrical contacts of the vacuum interrupter 11 are opened.

Figure 6:
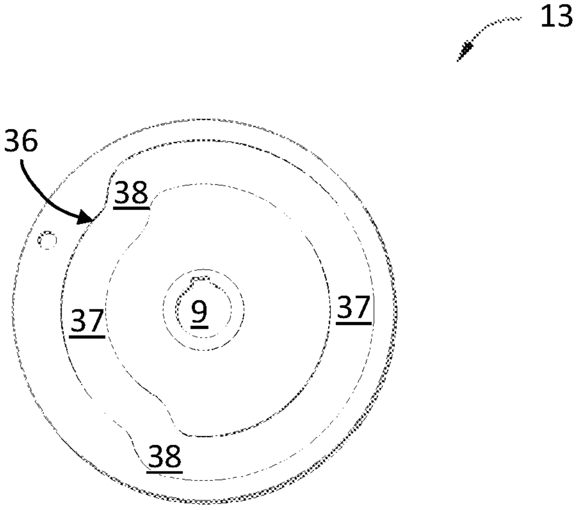
Figure 7:
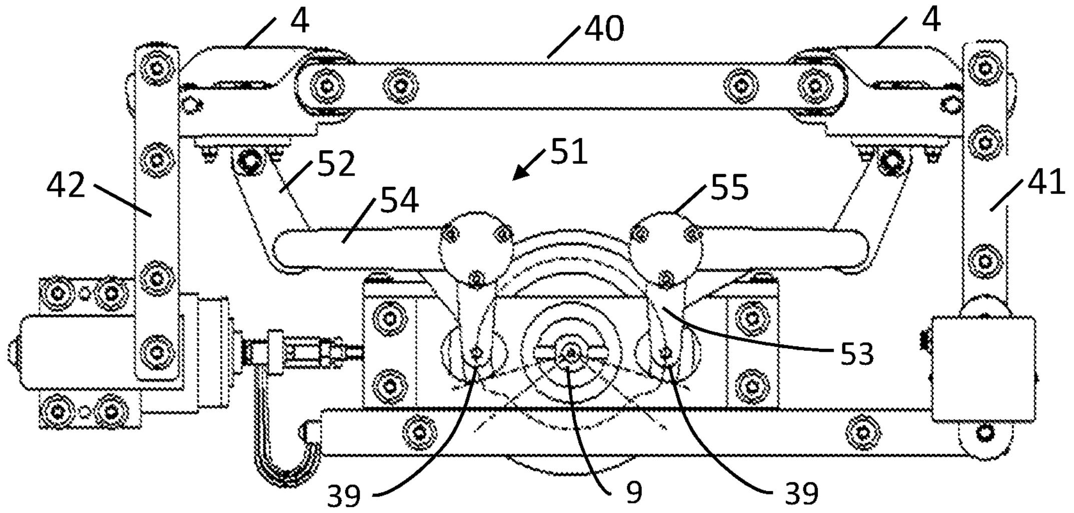
FIG. 7 a mechanical coupling of a bypath switch assembly with the second cam profile of FIG. 6, FIG. 8 a basic connection topology and switching state of a tap changer, FIGS. 9A to 9J further switching states of the tap changer of FIG. 8, FIGS. 10 and 11 an upper bypass switch in on opened state, FIGS. 12 and 13 a lower bypass switch in an opened state, FIG. 14 a perspective view of the vacuum interrupter module mounted on top of a selector switch assembly of the transformer load tap changer of FIG. 1.

As shown in FIG. 6, a second cam profile 36 is formed at an opposite second main side of the circular control cam 13, in the described embodiment the bottom side facing towards the insulation plate 3. The second cam profile 36 establishes an almost D-shaped guiding pathway, also surrounding the central hole 9. The pathway can also be described as two semicircles 37 with different radii, and two connecting S-shaped portions 38. As shown in FIG. 7, two second cam followers 39 engage, on opposite sides of the central hole 9, with the second cam profile 33 to control the bypass switch assembly 8. To this end, the second cam followers 39 are attached to the bypass levers 5, which in turn open or close the bypass contacts 4 depending on whether the respective second cam follower 39 is in a part of the guiding pathway with a smaller or larger distance from the central hole 9.

As still shown in FIG. 7, each bypass lever 5 comprises a first part 51 and a second part 52. The first part 51 in turn comprises a first arm 53 and a second arm 54, arranged at around 90 degrees with respect to a connecting axis of rotation 55. The second cam follower 39 is attached to an end of the first arm 53. One end of the second part 52 is movable attached by means of bearings to an end of the second arm 54. The other end of the second part is attached to a movable part of the bypass contact 4 with a bronze sleeve. At least one of the first part 51 or second part 52 is made from an insulating material, such as a polymer material, and is used to interrupt an electrical connection between the bypass contacts 4 and the other sub modules in the vacuum interrupter module, in particular the control cam 13 and the drive mechanism 12 attached thereto.

Figure 8:
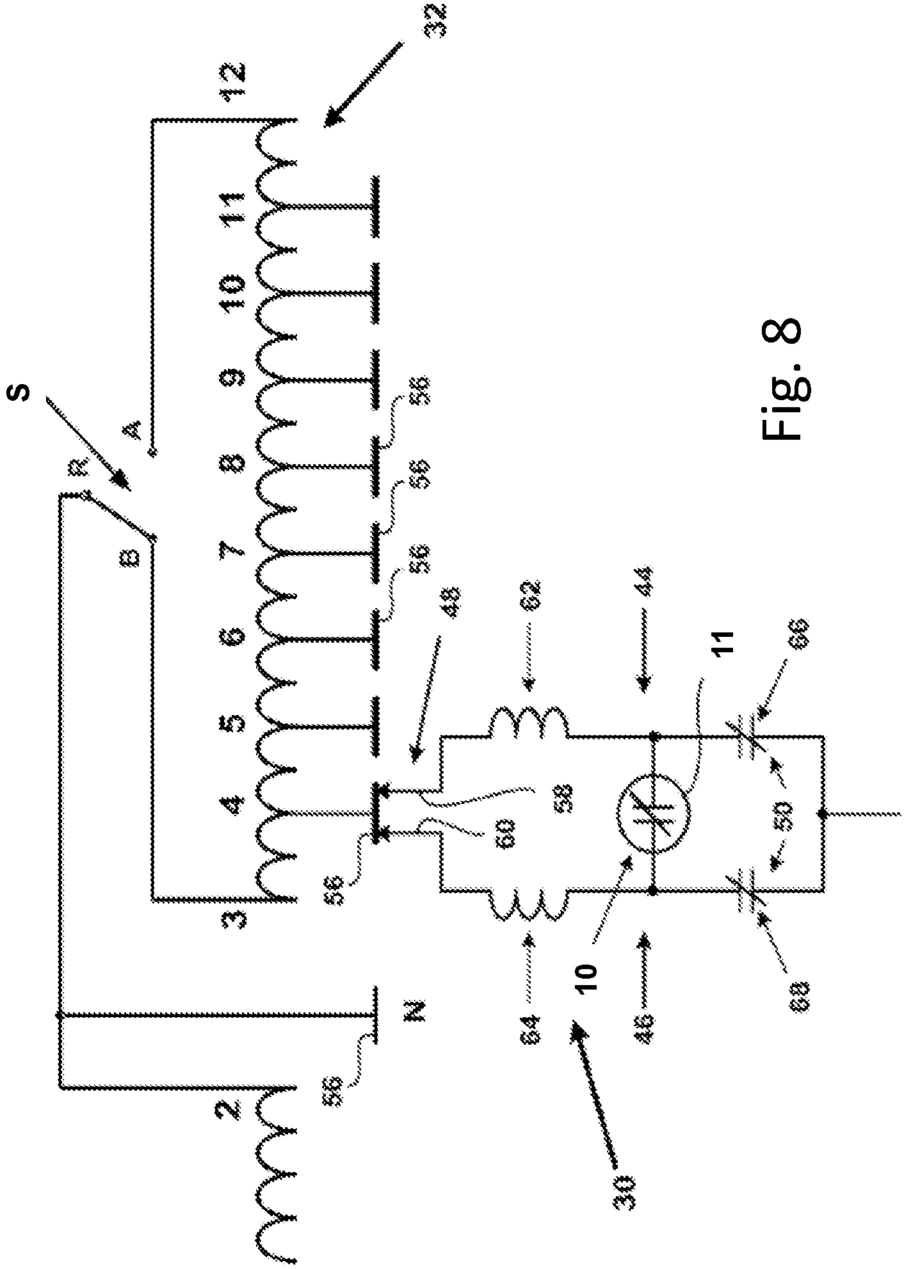

FIG. 7 further shows that the inner electrical contacts of the two bypass contacts 4 are electrically connected by means of a conductive copper bar 40, arranged below the insulation plate 3 (not shown in FIG. 7). As shown in FIG. 8, this the conductive bar 40 is connected to a common electrical connector of a power diverter switch. Further conductive bars 41 and 42 connect the respective outer electrical contacts of the two bypass contacts 4 with corresponding connections of the vacuum interrupter 11 and two electrical connections of the actual tap changer.

Referring now to FIG. 8, there is shown a schematic drawing of one of the electrical circuits 30 of the tap changing assembly connected to a regulating winding 32 in a plus-minus configuration. The electrical circuit 30 is arranged into first and second branch circuits 44, 46 and generally includes a selector switch assembly 48, the bypass switch assembly 8 and the vacuum interrupter assembly 10 comprising a vacuum interrupter 11.

The selector switch assembly 48 comprises movable first and second contact arms 58, 60 and a plurality of stationary contacts 56 which are connected to the taps of the winding 32, respectively. The first and second contact arms 58, 60 are connected to reactors 62, 64, respectively, which reduce the amplitude of the circulating current when the selector switch assembly 48 is bridging two taps. The first contact arm 58 is located in the first branch circuit 44 and the second contact arm 60 is located in the second branch circuit 46. The bypass switch assembly 50 comprises first and second bypass switches 66, 68, with the first bypass switch 66 being located in the first branch circuit 44 and the second bypass switch 68 being located in the second branch circuit 46. Each of the first and second bypass switches 66, 68 is connected between its associated reactor 62, 64 and the main power circuit. The vacuum interrupter 11 is connected between the first and second branch circuits 44, 46 and comprises a fixed contact and a movable contact enclosed in a bottle or housing having a vacuum therein.

The first and second contact arms 58, 60 of the selector switch assembly 48 can be positioned in a non-bridging position or a bridging position. In a non-bridging position, the first and second contact arms 58, 60 are connected to a single one of a plurality of taps on the winding 32 of the transformer. In a bridging position, the first contact arm 58 is connected to one of the taps and the second contact 60 is connected to another, adjacent one of the taps.

In FIG. 8, the first and second contact arms 58, 60 are both connected to tap 4 of the winding 32, i.e., the first and second contact arms 58, 60 are in a non-bridging position. In a steady state condition, the contacts of the vacuum interrupter 11 are closed and the contacts in each of the first and second bypass switches 66, 68 are closed. The load current flows through the first and second contact arms 58, 60 and the first and second bypass switches 66, 68. Substantially no current flows through the vacuum interrupter 11 and there is no circulating current in the reactor circuit.

Figure 9:
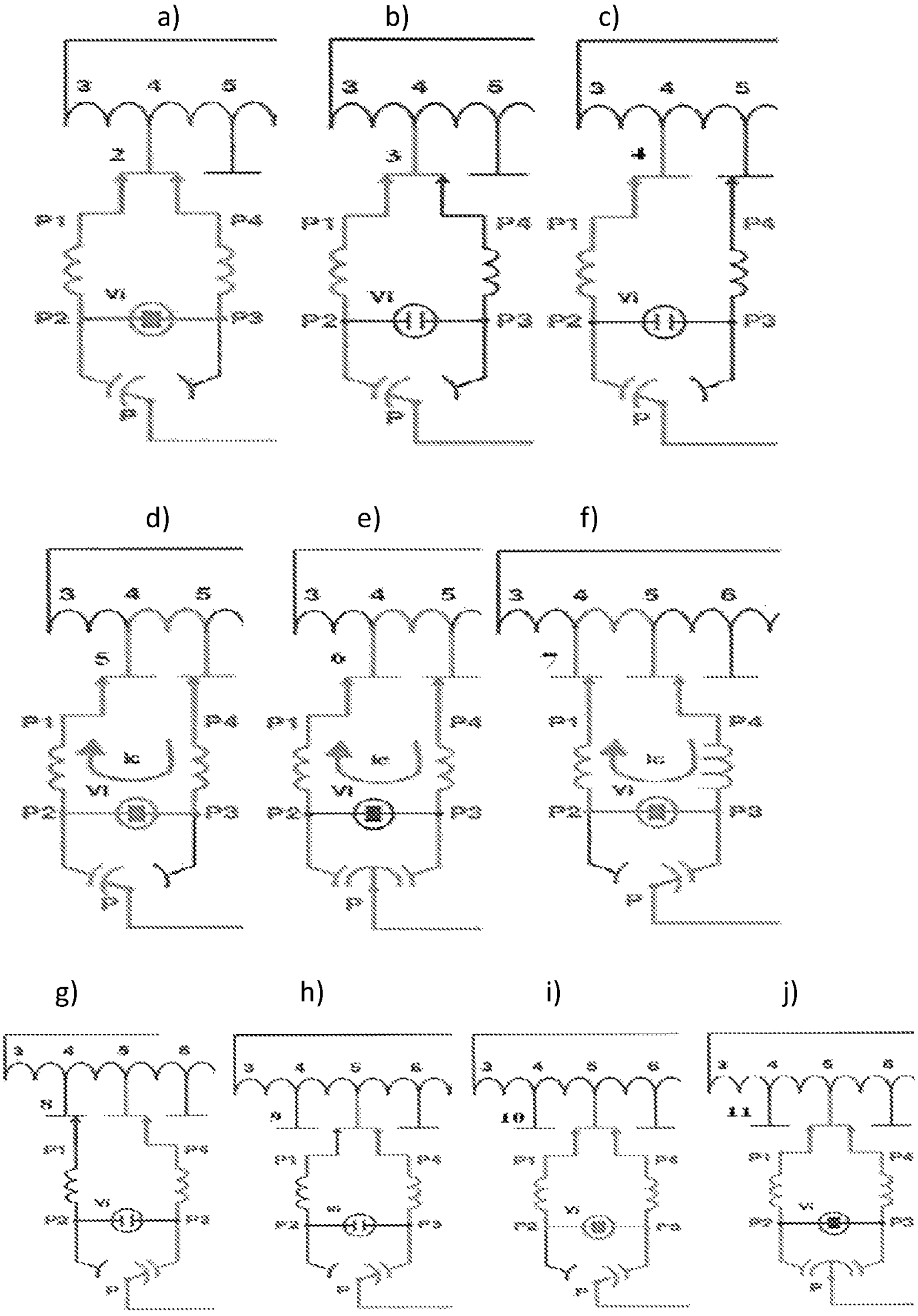

FIGS. 9A to 9J shown 10 further switching states during the switch from the initial tap, i.e. tap 4, to a neighboring tap, i.e. tap 5. All states shown in FIGS. 8 to 9J are controlled by a single drive mechanism, and in particular by the control cam 13 as described above.

In a first stage shown in FIG. 9A, an upper or first bypass switch 66 opens, i.e. by opening one of the two bypass contacts 4. Then, in a second stage shown in FIG. 9B, the vacuum interrupter 11 is opened. In a third stage shown in FIG. 9C, the upper or first contact arm 58 moves to tap 5. In a fourth stage shown in FIG. 9D, the vacuum interrupter 11 is closed. In a fifth stage shown in FIG. 9E, the upper or first bypass switch 66 closes. In a sixth stage shown in FIG. 9F, a lower or second bypass switch 68 opens. In a seventh stage shown in FIG. 9G, the vacuum interrupter 11 is opened again. In an eighth stage shown in FIG. 9H, the lower or second contact arm 60 moves to tap 5. In a ninth stage shown in FIG. 9I, the vacuum interrupter 11 is closed again. In a tenth stage shown in FIG. 9J, the lower or second bypass switch 68 closes. At this stage, the tap changer 100 has successfully changed from tap 4 to tap 5, with both contact arms 58, 60 connected to the same electrical potential, similar to the initial stage shown in FIG. 8. Further details of the electrical connections and potential states of a tap changer are described in US 2015/047 954 A1, whose content is included by reference herein.

Figure 10:
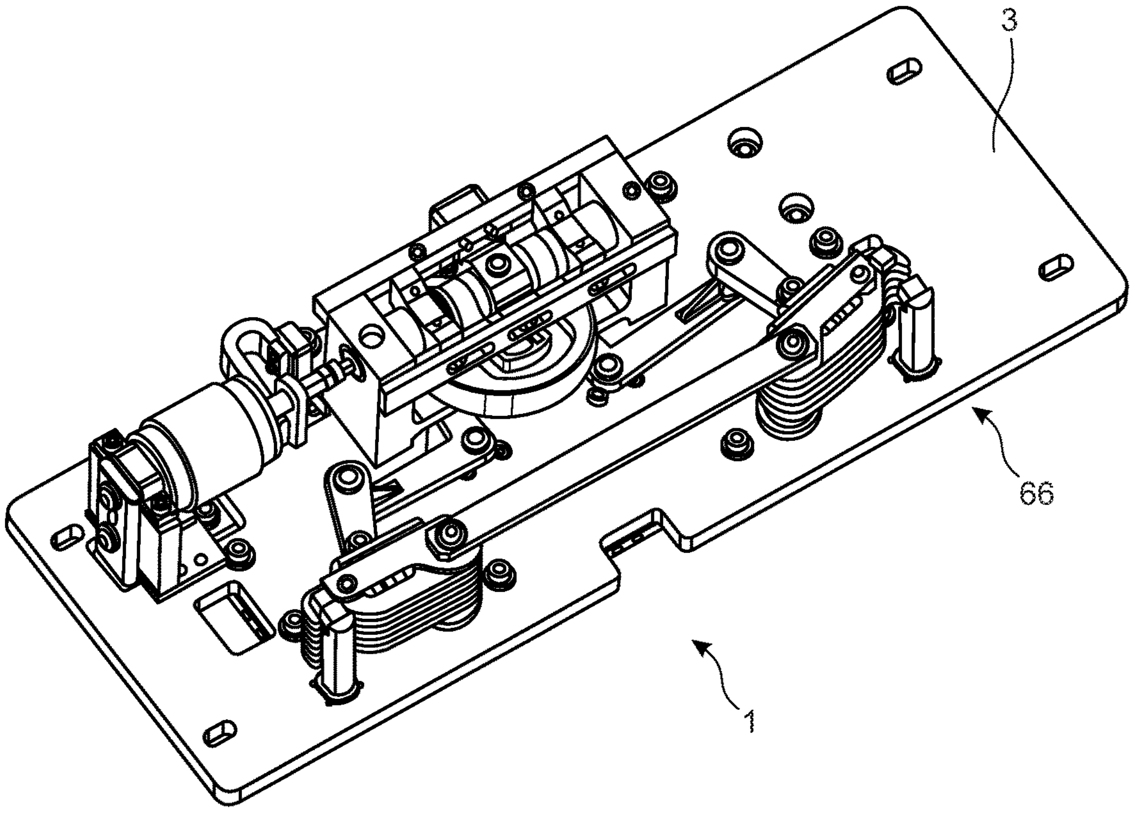
Figure 11:
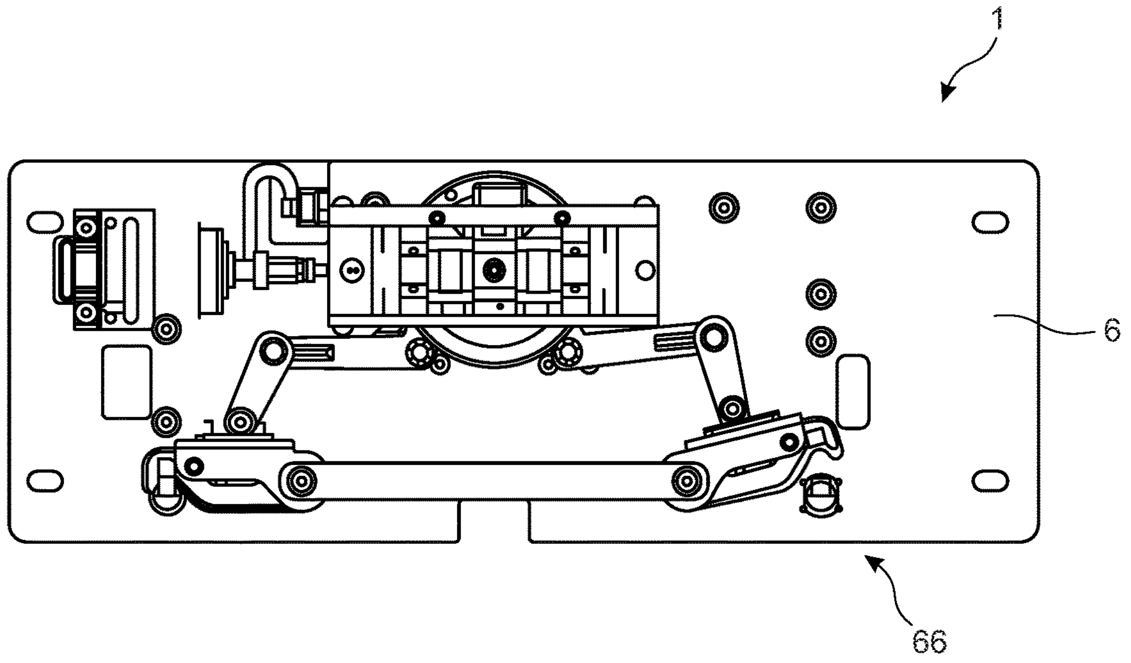
Figure 12:
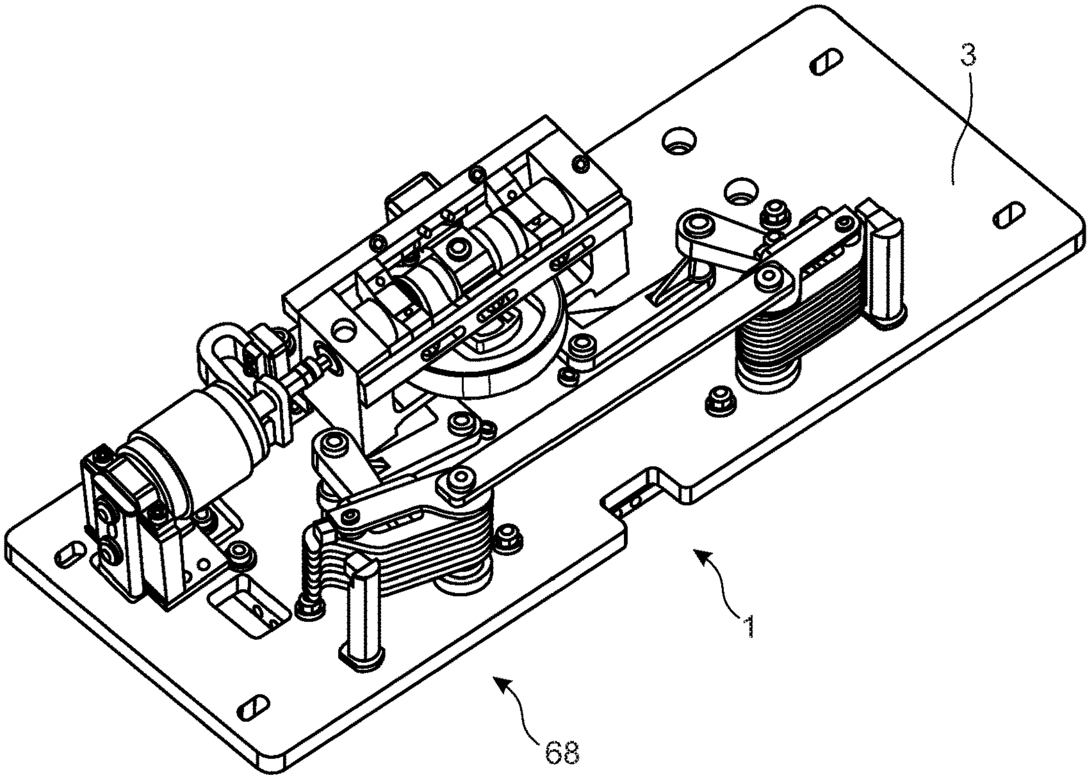
Figure 13:
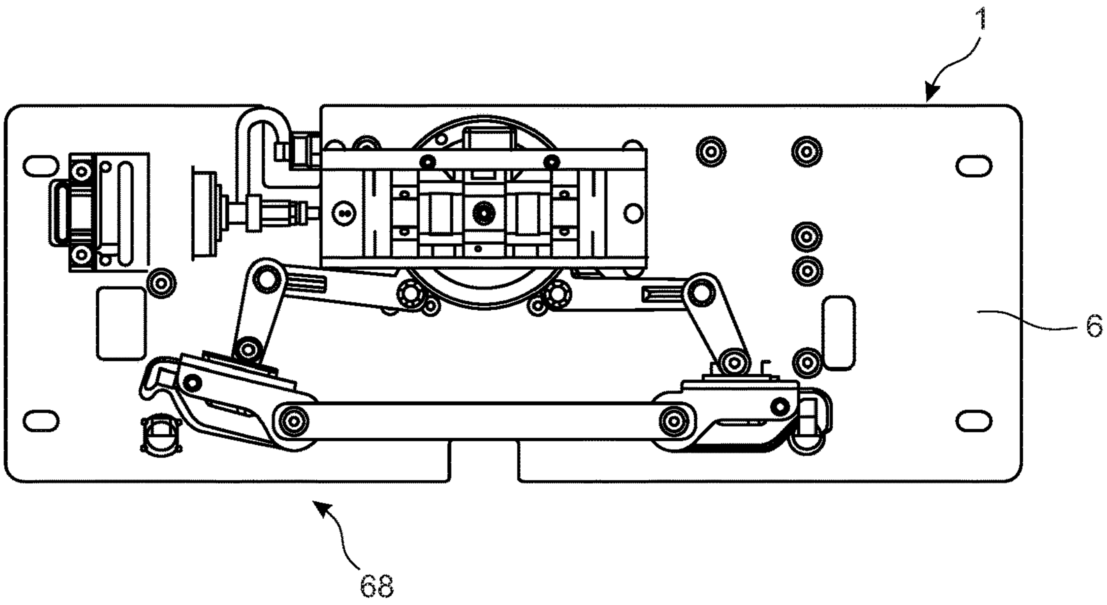

FIGS. 10 and 11 show the opening of the disclosed vacuum interrupter module 1 for the upper or first bypass switch 66 from different perspectives. FIGS. 12 and 13 show the opening of the disclosed vacuum interrupter module 1 for the lower or second bypass switch 68 from different perspectives. In particular, FIGS. 10 and 12 show perspective view onto the vacuum interrupter module 1, and FIGS. 11 and 13 show a top view onto the front side 6 of the insulation plate 3.

Figure 14:
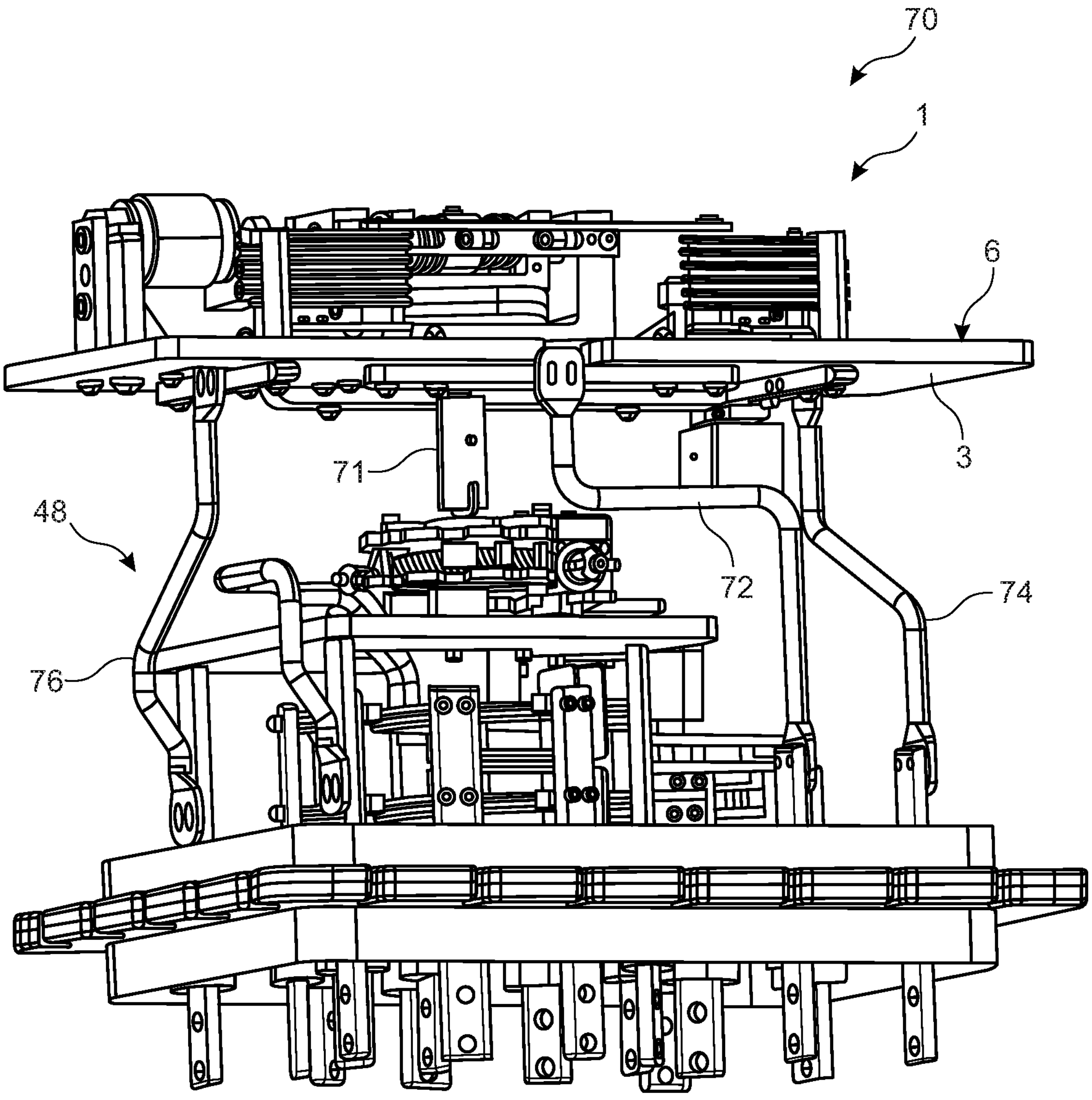

FIG. 14 shows a perspective view of a power diverter switch 70, comprising the vacuum interrupter module 1 mounted on top of a selector switch assembly 48. As can be seen therein, the movable parts of the two assemblies are connected to be driven by a common drive. In the disclosed embodiment, the driving connection is formed by a second insulation shaft 71, which in addition to the mechanical connection fulfills the functions of a cardan mechanism to compensate minimal positional displacements between the two assemblies 1 and 48. Still referring to FIG. 3, three electrical connections 72, 74, and 76 connect the conductive bars 40 to 42 with the respective electrical contacts of the selector switch assembly 48 as shown in and explained with reference to FIG. 8.

The described vacuum interrupter module 1 provides a beneficial robustness and contributes to reduced manufacturability and maintenance criteria. Inter alia, this is achieved by the single, common control cam 13 as well as the arrangement of essentially all moveable components of the vacuum interrupter module 1 on the upper front side 6 of the insulation plate 3. The use of a common control cam 13 simplifies to synchronize the various mechanical movements required and at the same time helps to reduce the part count. The arrangement of essentially all moveable parts on a more accessible front side 6 facilitates their maintenance and, if necessary, replacement due to wear.

The embodiments shown in the FIGS. 1 to 14 as stated represent exemplary embodiments of the improved power diverter switch assembly or vacuum interrupter module 1, vacuum interrupter assembly 1*o*, bypass switch assembly 8 and the transformer load tap changer 100, respectively.

Therefore, they do not constitute a complete list of all embodiments. Actual arrangements may vary from the embodiments shown in the figures.

REFERENCE SIGNS

1 vacuum interrupter module
2 current transformer
3 insulation plate
4 bypass contact
5 bypass lever
6 front side
7 back side
8 bypass switch assembly
9 central hole (of control cam)
10 vacuum interrupter assembly
11 vacuum interrupter
12 driving mechanism
13 control cam
14 driving spring
15 locking mechanism
16 adjusting system
17 locking system
18 guiding tube
19 driving rod
20 damping unit
21 first chamber
22 second chamber
23 first channel
24 second channel
25 first disc
26 second disc
27 first orifice
28 second orifice
29 piston
30 electrical circuit
31 first cam profile
32 winding
33 quarter circle
34 C-shaped portion
35 first cam follower
36 second cam profile
37 semicircle
38 S-shaped portion
39 second cam follower
40-42 conductive bar
44 first branch circuit
46 second branch circuit
48 selector switch assembly
51 first part
52 second part
53 first arm
54 second arm
55 axis of rotation
56 stationary contact
58 first contact arm
60 second contact arm
62 first reactor
64 second reactor
66 first bypass switch
68 second bypass switch
70 power diverter switch
71 second insulation shaft
72-76 electrical connection
100 transformer load tap changer
101 tank
102 motor drive shaft
103 insulation shaft
L longitudinal axis of the vacuum interrupter assembly

The invention claimed is:

1. A vacuum interrupter module for a tap changer, comprising:

an insulation plate having a first main side and a second main side opposite of the first main side carrying copper bars used for a schematic connection of the vacuum interrupter module;

a vacuum interrupter assembly comprising a vacuum interrupter and a driving mechanism coupled with the vacuum interrupter;

a bypass switch assembly comprising two bypass contacts mechanically connected to two corresponding bypass levers; and a control cam configured to actuate both the driving mechanism and, through the corresponding bypass levers, the two bypass contacts, the vacuum interrupter assembly, the driving mechanism, the bypass switch assembly, the two bypass contacts, and the control cam being arranged on the first main side of the insulation plate, such that the vacuum interrupter assembly, the driving mechanism, the bypass switch assembly, the two bypass contacts, and the control cam are accessible in a mounted position of the vacuum interrupter module.

2. The vacuum interrupter module of claim 1, wherein the control cam has a first cam profile and a second cam profile arranged on two opposite sides of the control cam, wherein the first cam profile is used for control of the vacuum interrupter assembly via the driving mechanism, and the second cam profile is used for control of the two bypass contacts via the corresponding bypass levers.

3. The vacuum interrupter module of claim 2, wherein the driving mechanism comprises a driving rod, a first cam follower mechanically connected to the driving rod, and a guiding tube enclosing the driving rod such that the driving rod is axially movable inside the guiding tube along a longitudinal axis of the vacuum interrupter assembly in response to a rotational movement of the control cam, when the first cam follower is engaged with the first cam profile.

4. The vacuum interrupter module of claim 3, wherein the first cam profile comprises four circle segments, the four circle segments having different, alternating first and second radii with respect to an axis of rotation of the control cam, and being connected by connecting portions.

5. The vacuum interrupter module of claim 4, wherein the four circle segments comprise four quarter circle segments.

6. The vacuum interrupter module of claim 4, wherein the connecting portions comprise C-shaped portions.

7. The vacuum interrupter module of claim 3, wherein the driving mechanism further comprises at least one driving spring arranged between the driving rod and the guiding tube and configured to accumulate energy during the rotational movement of the control cam to provide a predefined switching speed of the vacuum interrupter assembly.

8. The vacuum interrupter module of claim 2, wherein the bypass switch assembly further comprises two second cam followers, each second cam follower mechanically connected to one of the two bypass levers, such that a first one of the two bypass contacts can be selectively opened by rotating the control cam in a first direction, and a second one of the two bypass contacts can be selectively opened by rotating the control cam in a second direction, wherein both bypass contacts are closed if the control cam is in a neutral position, when the second cam followers are engaged with the second cam profile.

9. The vacuum interrupter module of claim 8, wherein the second cam profile comprises two circle segments, the two circle segments having different, alternating third and fourth radii with respect to an axis of rotation of the control cam, and being connected by connecting portions.

10. The vacuum interrupter module of claim 9, wherein the two circle segments comprise two semicircle segments.

11. The vacuum interrupter module of claim 9, wherein the connecting portions comprise S-shaped portions.

12. The vacuum interrupter module of claim 8, wherein each one of the two bypass levers comprises at least one insulated part configured to interrupt an electrical connection between the respective bypass contact and the vacuum interrupter assembly.

13. The vacuum interrupter module of claim 1, further comprising at least one conductive bar arranged on the second main side of the insulation plate for providing an electrical connection between the two bypass contacts, between a first one of the two bypass contacts and a first contact of the vacuum interrupter, and/or between a second one of the two bypass contacts and a second contact of the vacuum interrupter.

14. A power diverter switch, comprising:
- a vacuum interrupter module comprising:
  - an insulation plate having a first main side and a second main side opposite of the first main side carrying copper bars used for a schematic connection of the vacuum interrupter module;
  - a vacuum interrupter assembly comprising a vacuum interrupter and a driving mechanism coupled with the vacuum interrupter;
  - a bypass switch assembly comprising two bypass contacts mechanically connected to two corresponding bypass levers; and
  - a control cam configured to actuate both the driving mechanism and, through the corresponding bypass levers, the two bypass contacts;
  - the vacuum interrupter assembly, the driving mechanism, the bypass switch assembly, the two bypass contacts, and the control cam being arranged on the first main side of the insulation plate, such that the vacuum interrupter assembly, the driving mechanism, the bypass switch assembly, the two bypass contacts, and the control cam are accessible in a mounted position of the vacuum interrupter module; and
- a selector switch assembly electrically coupled with electrical contacts of the vacuum interrupter module.

15. The power diverter switch of claim 14, wherein the control cam of the vacuum interrupter module has a first cam profile and a second cam profile arranged on two opposite sides of the control cam, wherein the first cam profile is used for control of the vacuum interrupter assembly via the driving mechanism, and the second cam profile is used for control of the two bypass contacts via the corresponding bypass levers.

16. The power diverter switch of claim 14, wherein the selector switch assembly is mechanically coupled with the control cam of the vacuum interrupter module via a first insulation shaft.

17. A tap changer comprising:
- a plurality of power diverter switches, each power diverter switch comprising:
  - a vacuum interrupter module comprising:
    - an insulation plate having a first main side and a second main side opposite of the first main side carrying copper bars used for a schematic connection of the vacuum interrupter module;
    - a vacuum interrupter assembly comprising a vacuum interrupter and a driving mechanism coupled with the vacuum interrupter;
    - a bypass switch assembly comprising two bypass contacts mechanically connected to two corresponding bypass levers; and
    - a control cam configured to actuate both the driving mechanism and, through the corresponding bypass levers, the two bypass contacts;
    - the vacuum interrupter assembly, the driving mechanism, the bypass switch assembly, the two bypass contacts, and the control cam being arranged on the first main side of the insulation plate, such that the vacuum interrupter assembly, the driving mechanism, the bypass switch assembly, the two bypass contacts, and the control cam are accessible in a mounted position of the vacuum interrupter module; and
  - a selector switch assembly electrically coupled with electrical contacts of the vacuum interrupter module; and
- at least one second insulation shaft, mechanically connecting the control cam of each one of the plurality of power diverter switches and configured to transmit an incoming motion.

18. The tap changer of claim 17, wherein the second insulation shaft is arranged on the second main side of the insulation plate of each one of the plurality of power diverter switches.

19. The tap changer of claim 17, further comprising a tank with an opening, the tank being configured for holding a dielectric fluid, wherein the plurality of power diverter switches are arranged inside the tank such that the first main side of the insulation plate of each of the vacuum interrupter modules faces the opening of the tank.

20. The tap changer of claim 19, further comprising:
- a drive system, mechanically coupled the second insulation shaft through a motor drive shaft to control each one of the power diverter switches, wherein at least parts of the drive system are arranged outside the tank.

* * * * *